(12) United States Patent
Kuan et al.

(10) Patent No.: US 7,215,391 B2
(45) Date of Patent: May 8, 2007

(54) LIQUID CRYSTAL ON SILICON DISPLAY WITH MICRO COLOR FILTERS POSITIONED ON THE TOP SURFACE OF THE TRANSPARENT SUBSTRATE

(75) Inventors: Ta-Shuang Kuan, Hsin-Chu Hsien (TW); Chia-Tsung Chan, Tao-Yuan Hsien (TW); Chia-Te Lin, Chia-Yi Hsien (TW)

(73) Assignee: United Microelectronics Corp., Hsin-Chu (TW)

( * ) Notice: Subject to any disclaimer, the term of this patent is extended or adjusted under 35 U.S.C. 154(b) by 8 days.

(21) Appl. No.: 10/710,506

(22) Filed: Jul. 16, 2004

(65) Prior Publication Data

US 2006/0012734 A1   Jan. 19, 2006

(51) Int. Cl.
*G02F 1/1335* (2006.01)

(52) U.S. Cl. .................... 349/106; 349/5; 349/108

(58) Field of Classification Search ............. 349/108, 349/106

See application file for complete search history.

(56) References Cited

U.S. PATENT DOCUMENTS

| | | | |
|---|---|---|---|
| 4,350,729 A * | 9/1982 | Nakano et al. | 428/209 |
| 6,452,652 B1 | 9/2002 | Moore | |
| 6,511,187 B1 | 1/2003 | Salerno et al. | |
| 6,727,967 B2 * | 4/2004 | Nakamura et al. | 349/114 |
| 2001/0004108 A1 * | 6/2001 | Iwamatsu et al. | 252/299.7 |
| 2004/0095527 A1 * | 5/2004 | Liao | 349/106 |
| 2004/0150777 A1 * | 8/2004 | Koike | 349/139 |
| 2005/0122464 A1 * | 6/2005 | Lu | 349/190 |

FOREIGN PATENT DOCUMENTS

WO   WO03096107 A1   11/2003

* cited by examiner

*Primary Examiner*—Andrew Schechter
*Assistant Examiner*—Lucy Chien
(74) *Attorney, Agent, or Firm*—Winston Hsu

(57) ABSTRACT

An LCOS display panel includes a silicon substrate having a plurality of pixels arranged in a pixel array thereon, a transparent substrate positioned above the silicon substrate, a liquid crystal layer positioned between the transparent substrate and the silicon substrate, and a plurality of micro color filters positioned on the top surface of the transparent substrate and corresponding to subpixels of the pixels.

42 Claims, 3 Drawing Sheets

LIQUID CRYSTAL ON SILICON DISPLAY WITH MICRO COLOR FILTERS POSITIONED ON THE TOP SURFACE OF THE TRANSPARENT SUBSTRATE

BACKGROUND OF INVENTION

1. Field of the Invention

The invention relates to a liquid crystal on silicon display (LCOS display), and more particularly, to an LCOS display having color filters positioned on the top surface of the cover substrate.

2. Description of the Prior Art

LCOS display technology is the key of reflective LCOS projectors and rear-projection televisions. The advantages of LCOS micro-displays are a tiny size, high resolution, low power, low cost, etc. The difference between an LCOS display and a conventional thin film transistor-liquid crystal display (TFT-LCD) is materials used for forming substrates. Both a cover substrate and a backplane are made of glass in a TFT-LCD. Nevertheless, the cover substrate in an LCOS display is made of glass, but the backplane in an LCOS display is a semiconductor silicon substrate. Therefore, an LCOS process combines LCD techniques and complementary metal-oxide semiconductor (CMOS) processes.

The main structure of an LCOS display includes a light source module, an LCOS panel, and a color separation and combination optical system. Generally speaking, the LCOS display can be divided into three-panel LCOS displays and single-panel LCOS displays according to the type of optical engine. The three-panel type optical engine separates lights generated from light source into red, blue, and green lights through a plurality of prisms, projects those lights into three separated LCOS panels respectively, and combines those three lights from LCOS panels to form colored images. The single-panel type optical engine utilizes a color wheel to form red, blue, and green lights sequentially from white lights, and synchronizes the three kinds of lights with single-colored images, the red, blue, and green images, formed by driving programs so as to produce color-separated images sequentially. Since human eyes have the persistence of vision, people can see colored images from the projected images.

Please refer to FIG. 1, which is a schematic diagram of a portion of an LCOS panel 10 according to the prior art. The LCOS panel 10 comprises a semiconductor substrate 12 with pluralities of MOS transistors and pixel electrodes (not shown) thereon, a glass substrate 14 positioned in parallel with and opposite to the semiconductor substrate 12, a liquid crystal layer 16 positioned between the semiconductor substrate 12 and the glass substrate 14, and a transparent conductive layer 18 positioned on the liquid crystal layer 16. Generally, a conventional LCOS panel 10 comprises an anti-reflective (AR) coating 22 positioned on the upper surface of the glass substrate 14, which is a light exit surface or a display surface of the LCOS panel 10, and two alignment layers (not shown) positioned on the top and bottom sides of the liquid crystal layer 16. The conventional LCOS panel 10 may further comprise a color filter 20 positioned between the transparent conductive layer 18 and the glass substrate 14 or between the alignment layer above the liquid crystal layer 16 and the transparent conductive layer 18.

However, no matter if the color filter 20 is positioned between the glass substrate 14 and the transparent conductive layer 18, or between the transparent conductive layer 18 and the alignment in the prior art, it causes a disadvantage of heat generated by the color filter 20 when the LCOS panel 10 is operating accumulating in the inner portion of the LCOS panel 10 because the heat cannot be removed by an outer cooling system easily. Consequently, the longevity of the elements of the LCOS panel 10 decreases. Therefore, how to design a structure of the LCOS panel for improving the performance of heat radiation so as to extend the longevity of the elements of the LCOS panel is still an important issue for manufacturers.

SUMMARY OF INVENTION

It is therefore a primary objective of the claimed invention to provide an LCOS display panel that has a better performance of heat irradiating and lower cost to solve the above-mentioned problem.

According to the claimed invention, the display panel comprises a silicon substrate having a plurality of pixels arranged in a pixel array thereon, a transparent substrate positioned above the silicon substrate, a liquid crystal layer positioned between the transparent substrate and the silicon substrate, and a plurality of micro color filters positioned on the top surface of the cover substrate, which is a transparent substrate. Each of the pixels on the silicon substrate comprises a plurality of subpixels, and each of the micro color filters is positioned corresponding with one of the subpixels.

It is an advantage of the claimed invention that the micro color filters are positioned on the top surface of the transparent substrate, so that heat does not accumulate in the inner portion of the display panel to overheat the display panel that causes damage to the inner elements. Furthermore, the heat generated by the micro color filters positioned on the display panel can be easily removed by an outer cooling system, such as a cooling fan, to maintain a preferable temperature of the display panel. On the other hand, when the micro color filters are positioned on the top surface of the transparent substrate, an AR coating can be substituted so as to decrease the fabricating cost of the display panel.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
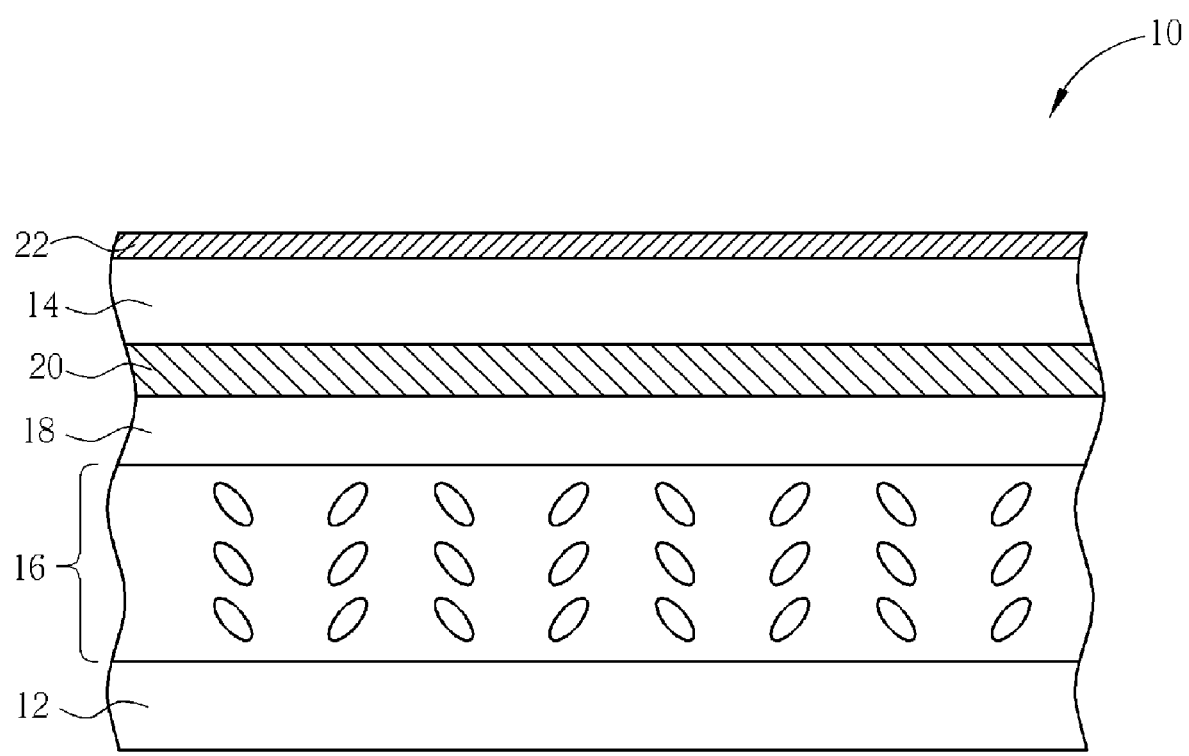
FIG. 1 is a section view of a portion of an LCOS panel according to the prior art.
Figure 2:
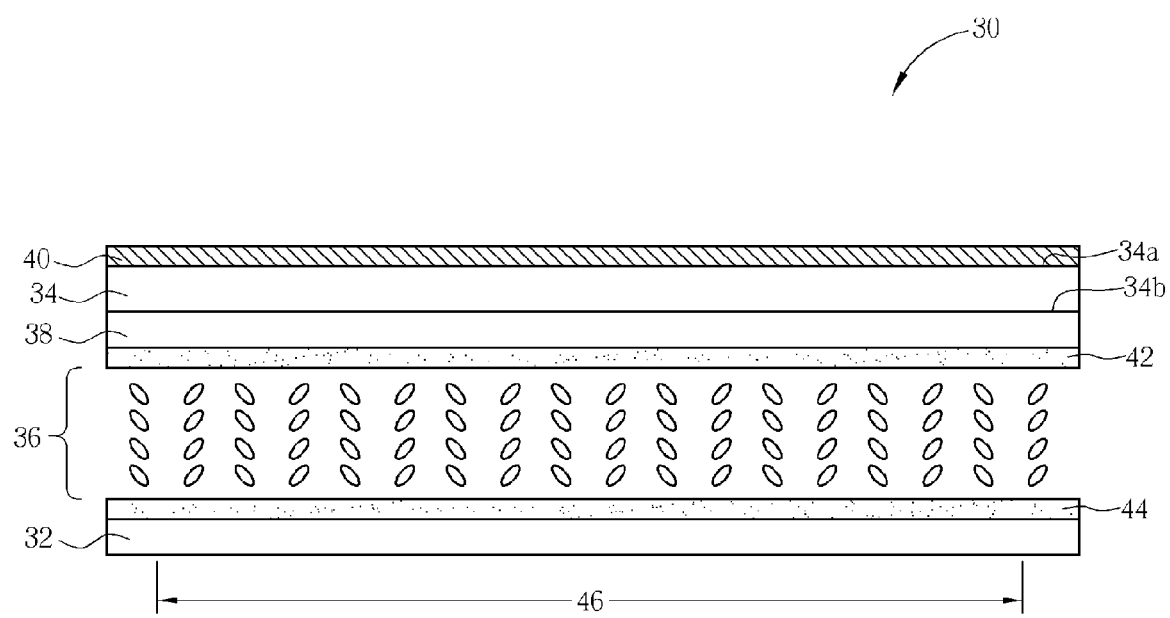
FIG. 2 is a section view of an LCOS panel according to the present invention.

Please refer to FIG. 2. FIG. 2 is a section view of an LCOS panel 30 according to the present invention. LCOS panel 30 comprises a silicon substrate 32, a transparent substrate 34 positioned above the silicon substrate 32, and a liquid crystal layer 36 positioned between the silicon substrate 32 and the transparent substrate 34. The silicon substrate 32 has a pixel region 46 thereon and a plurality of MOS transistors and corresponding pixels (not shown) are positioned in the pixel region 46. The transparent substrate 34 has a top surface 34*a* and bottom surface 34*b*. On the bottom surface 34*b* of the transparent substrate 34 is a transparent conductive layer 38, such as an indium tin oxide (ITO) layer. A top alignment layer 42 and a bottom alignment layer 44 are positioned between the liquid crystal layer 36 and the transparent conductive layer 38, and between the liquid crystal layer 36 and the silicon substrate 32 respectively for adjusting the arrangement directions of the liquid crystal molecules in the liquid crystal layer 36. In this embodiment, the transparent substrate 34 is a glass substrate. However, the transparent substrate 34 can also be composed of other transparent materials, such as quartz.

The LCOS panel 30 further comprises a color filter 40 positioned on the top surface 34a of the transparent substrate 34 and corresponding with the pixel region 6. The color filter 40 can be composed of a photosensitive material, such as a photoresist material or a photosensitive resin. In addition, the photosensitive material further contains red, blue, or green dyes so that the LCOS panel 30 can reflect lights with a specific color. The reflected lights exit the LCOS panel 30 from the top surface 34a of the transparent substrate 34 and mix to form colorful images. Therefore, the top surface 34a of the transparent substrate 34 is a light exit surface or display surface of the LCOS panel 30.

In this embodiment, the LCOS panel 30 can be applied to a three-panel LCOS display. That can be performed by positioning three LCOS panels 30 with a red color filter, a blue color filter, and a green color filter respectively in the three-panel LCOS display, and using a combination optical system to combine the red, blue, and green images from the three LCOS panels 30 to form complete and colorful images.

Figure 3:
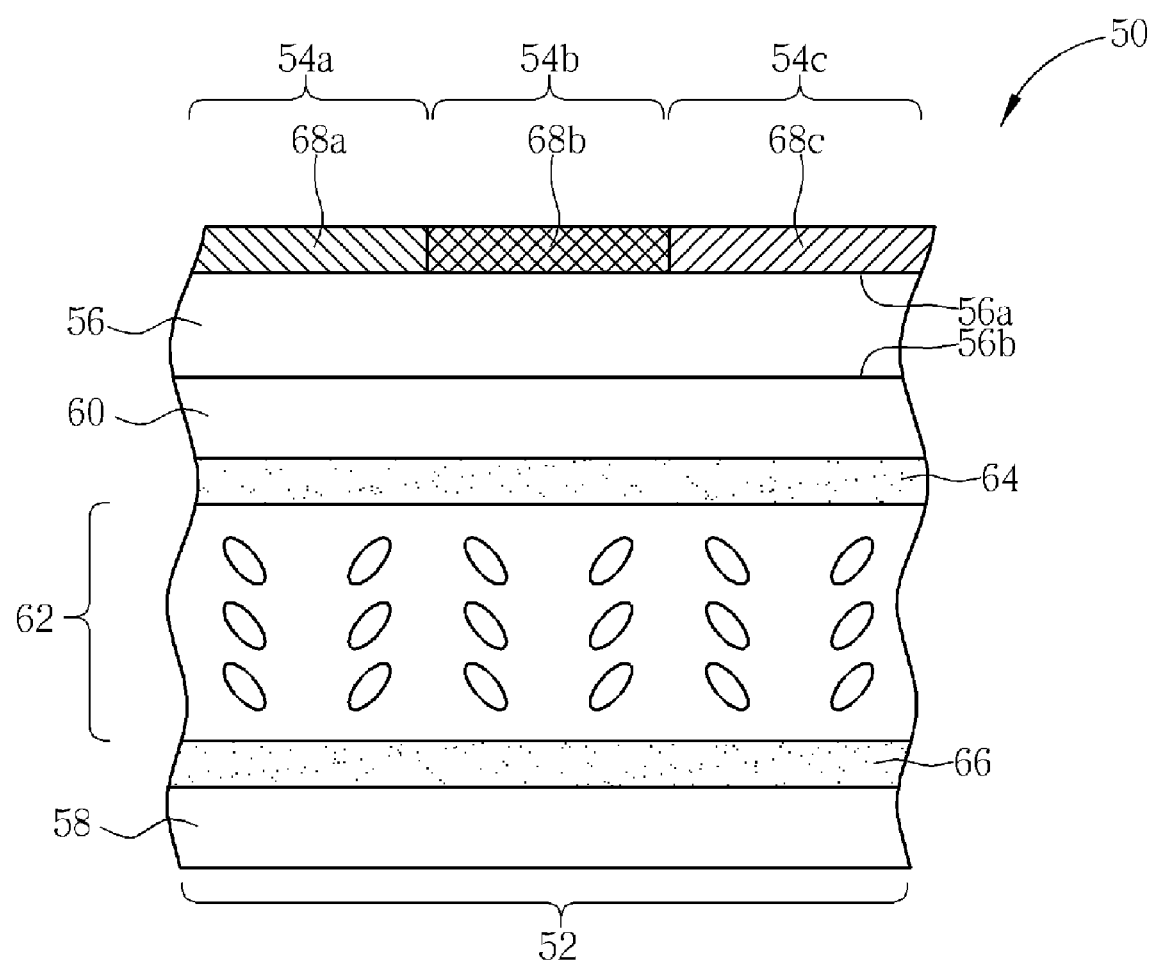
FIG. 3 is a section view of a portion of an LCOS panel of another embodiment according to the present invention.

Referring to FIG. 3, which is a section view of a portion of an LCOS panel 50 of another embodiment according to the present invention. The present invention LCOS display has an LCOS panel 50 comprising a silicon substrate 58, a glass substrate 56, and a liquid crystal layer 62 positioned between the silicon substrate 58 and the glass substrate 56. An ITO layer 60, serving as the transparent conductive layer, is positioned between the glass substrate 56 and on its bottom surface 56b. The LCOS panel 50 further comprises a top alignment layer 64 positioned above the liquid crystal layer 62 and below the ITO layer 60. The silicon substrate 58 is a semiconductor substrate having a plurality of pixels arranged in a pixel array. Each of the pixels further comprises three subpixels. In FIG. 3, only one pixel 52 and its subpixels 54a, 54b, 54c are illustrated. Each of the subpixels 54a, 54b, 54c contains a MOS transistor and a metal electrode (not shown) for controlling the corresponding subpixels 54a, 54b, 54c so that the liquid crystal molecules in the liquid crystal layer 62 twist to let light pass through the liquid crystal layer 62. Furthermore, a bottom alignment layer 66 is positioned on the silicon substrate 58.

The LCOS panel 50 further comprises a plurality of micro color filters, the red micro color filters 68a, the blue micro color filters 68b, and the green micro color filters 68c corresponding with one of the subpixels 54a, 54b, 54c of each of the pixels 52. Each of the red micro color filters 68a, the blue micro color filters 68b, and the green micro color filters 68c is composed of pluralities of stacked optical thin films that forms a low index optical thin-film stack comprising a silicon oxide ($SiO_2$) thin film or forms a high index optical thin-film stack comprising a titanium oxide ($TiO_2$) thin film or a tantalum oxide ($Ta_2O_5$) thin film. In this embodiment, the optical thin films forming micro color filters are dichroic films.

The micro color filters are used for filtering lights of specific spectrums. The red micro color filters 68a, blue micro color filters 68b, and green micro color filters 68c shown in FIG. 3 only permit lights of a first specific spectrum, a second specific spectrum, and a third specific spectrum to pass respectively. In a preferred embodiment of the present invention, the lights of the first specific spectrum, the second specific spectrum, and the third specific spectrum are red, green, and blue lights respectively. In addition, the red micro color filters 68a, blue micro color filters 68, and green micro color filters 68c are positioned corresponding with the metal electrodes of the subpixels 54a, 54b, 54c on the surface of the silicon substrate 58 respectively. Therefore, the lights passing through the red micro color filters 68a, the blue micro color filters 68b, and the green micro color filters 68c can be reflected by the under metal electrodes to the light exit surface of the LCOS panel 50, which is the top surface 56a of the glass substrate 56, hence the reflected lights of different spectrums mix to form colorful images.

In another embodiment of the present invention, the red micro color filters 68a, the blue micro color filters 68b, and the green micro color filters 68c are composed of photosensitive materials, such as photoresist materials or photosensitive resins, containing red, blue, or green dyes to filter white lights passing through the micro color filters. Similarly, the filtered red lights, blue lights, and green lights can be reflected to form colorful images.

Furthermore, opaque layers (not shown) can be optically coated among the red micro color filters 68a, blue micro color filters 68b, and green micro color filters 68c to reduce interferences between different color lights and improve the signal to noise ratio, leading to an enhanced display performance. The materials of the opaque layers can be selected from any one of Al, Cr, Ni, Cu, Fe, Zn, Ti, Au, Ag, Pt, W, Mo, Ta, Zr, C or mixtures of them.

The present invention LCOS panel 50 can be applied to a single-panel LCOS display. Since the LCOS panel 50 can produce color images directly through the red micro color filters 68a, blue micro color filters 68b, and the green micro color filters 68c, no complicated optical engines, such as a color wheel or a color separation and combination optical system, have to be installed in the LCOS display. Therefore the fabricating cost can be decreased effectively, and the physical volume of the LCOS display can also be reduced so as to satisfy the requirement of the LCOS display market.

In contrast to the prior art, the present invention provides a display panel that has color filters composed of optical thin-film stacks or photosensitive materials positioned on the cover substrate, the transparent substrate. Consequently, the problem of the prior art in which heat accumulates in the inner portion of the LCOS panel resulting in overheating of the LCOS panel can be solved. Since the color filters are positioned on the surface of the LCOS panel, the heat generated by the color filters when the LCOS is operating can be removed easily by a cooling system positioned near the LCOS panel. For example, a cooling fan can be positioned near the LCOS panel to reduce the temperature of the color filters so that the surface of the LCOS panel is cooled to maintain a preferable temperature. On the other hand, to position the color filters on the surface of the transparent substrate of the LCOS panel, an AR coating of the conventional LCOS panel can be substituted to lower the cost to LCOS panel manufacturers.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A display panel comprising:
a silicon substrate having a plurality of pixels arranged in a pixel array thereon, each of the pixels comprising a plurality of subpixels;
a transparent substrate positioned above the silicon substrate, the transparent substrate having a top surface and a bottom surface;
a liquid crystal layer positioned between the transparent substrate and the silicon substrate; and
a plurality of micro color filters positioned on the top surface of the transparent substrate, each of the micro color filters being positioned corresponding one of the subpixels.

2. The display panel of claim 1 further comprising a transparent conductive layer positioned on the bottom surface of the transparent substrate while the micro color filters are positioned on the top surface of the same transparent substrate but opposite to the transparent conductive layer.

3. The display panel of claim 2, wherein the transparent conductive layer is an indium tin oxide (ITO) layer.

4. The display panel of claim 1 further comprising a top alignment layer positioned between the transparent substrate and the liquid crystal layer.

5. The display panel of claim 1 further comprising a bottom alignment layer positioned between the silicon substrate and the liquid crystal layer.

6. The display panel of claim 1, wherein the transparent substrate is a glass substrate.

7. The display panel of claim 1, wherein the micro color filters comprise a plurality of red micro color filters, a plurality of blue micro color filters, and a plurality of green micro color filters, each of the red micro color filters, the blue micro color filters, and the green micro color filters being positioned corresponding one of the subpixels of each of the pixels.

8. The display panel of claim 7, wherein the micro color filters comprise photosensitive materials.

9. The display panel of claim 8, wherein the red micro color filters, the blue micro color filters, and the green micro color filters further comprise red, blue, and green dyes.

10. The display panel of claim 8, wherein the photosensitive materials are photoresist materials or photoresist resins.

11. The display panel of claim 7, wherein each of the micro color filters comprises a plurality of optical thin films.

12. The display panel of claim 11, wherein the optical thin films are dichroic films.

13. The display panel of claim 11, wherein each of the micro color filters is an optical thin-film stack.

14. The display panel of claim 13, wherein the optical thin-film stacks are low index optical thin-film stacks comprising silicon oxide (SiO2) thin films.

15. The display panel of claim 13, wherein the optical thin-film stacks are high index optical thin-film stacks comprising titanium oxide (TiO2) thin films or tantalum oxide (Ta2O5) thin films.

16. The display panel of claim 11, wherein when light enters the display panel, lights of a first specific spectrum, a second specific spectrum, and a third specific spectrum are capable of passing through the corresponding micro color filters.

17. The display panel of claim 16, wherein lights of the first specific spectrum, the second specific spectrum, and the third specific spectrum are red, blue, and green lights respectively.

18. A display panel comprising:
a silicon substrate having a pixel region thereon;
a transparent substrate positioned above the silicon substrate, the transparent substrate having a top surface and a bottom surface;
a liquid crystal layer positioned between the silicon substrate and the transparent substrate; and
at least a color filter positioned on the top surface of the transparent substrate and corresponding to the pixel region.

19. The display panel of claim 18 further comprising a transparent conductive layer positioned on the bottom surface of the transparent substrate while the color filter is positioned on the top surface of the same transparent substrate but opposite to the transparent conductive layer.

20. The display panel of claim 18, wherein the transparent conductive layer is an indium tin oxide layer.

21. The display panel of claim 18 further comprising a top alignment layer positioned between the transparent conductive layer and the liquid crystal layer.

22. The display panel of claim 18 further comprising a bottom alignment layer positioned between the silicon substrate and the liquid crystal layer.

23. The display panel of claim 18, wherein the transparent substrate is a glass substrate.

24. The display panel of claim 18, wherein the color filter comprises a photosensitive material.

25. The display panel of claim 24, wherein the photosensitive material comprises at least a color dye.

26. The display panel of claim 24, wherein the photosensitive material is a photoresist material or a photosensitive resin.

27. The display panel of claim 18, wherein the color filter is an optical thin-film stack comprising a plurality of optical thin films.

28. The display panel of claim 27, wherein the optical thin films are dichroic films.

29. The display panel of claim 27, wherein the optical thin-film stack is a low index optical thin-film stack comprising a silicon oxide (SiO2) thin film.

30. The display panel of claim 27, wherein the optical thin-film stack is a high index optical thin-film stack comprising a titanium oxide thin film or a tantalum oxide thin film.

31. The display panel of claim 1, wherein the silicon substrate comprises a semiconductor material.

32. The display panel of claim 1, wherein the display panel is a liquid crystal on silicon (LCOS) display.

33. The display panel of claim 18, wherein the silicon substrate comprises a semiconductor material.

34. The display panel of claim 18, wherein the display panel is an LCOS display.

35. The display panel of claim 18, wherein the silicon substrate comprises a plurality of subpixels arranged in the pixel region, and the display panel comprises a plurality of the color filters, each of the color filters being positioned corresponding to one of the subpixels in the pixel region.

36. The display panel of claim 35, wherein the color filters are micro color filters.

37. The display panel of claim 36, wherein the micro color filters comprise a plurality of red micro color filters, a plurality of blue micro color filters, and a plurality of green micro color filters, each of the red micro color filters, the blue micro color filters, and the green micro color filters being positioned corresponding one of the subpixels of each of the pixels.

38. The display panel of claim 36, wherein the micro color filters comprise photosensitive materials, and the red micro color filters, the blue micro color filters, and the green micro color filters further comprise red, blue, and green dyes.

39. The display panel of claim 37, wherein when light enters the display panel, lights of a first specific spectrum, a second specific spectrum, and a third specific spectrum are capable of passing through the corresponding micro color filters.

40. The display panel of claim 39, wherein lights of the first specific spectrum, the second specific spectrum, and the third specific spectrum are red, blue, and green lights respectively.

41. The display panel of claim 1, wherein the top surface of the transparent substrate is a light exit surface of the display panel so that the micro color filters are positioned on the light exit surface of the display panel.

42. The display panel of claim 18, wherein the top surface of the transparent substrate is a light exit surface of the display panel so that the color filter is positioned on the light exit surface of the display panel.

* * * * *